United States Patent

Andrä et al.

Patent Number: 5,796,249
Date of Patent: Aug. 18, 1998

[54] MAGNETORESISTIVE ANGULAR POSITION SENSOR AND ROTATION SPEED SENSOR

[75] Inventors: Wulf Andrä; Roland Mattheis, both of Jena, Germany

[73] Assignees: Institut fuer Physikalische Hochtechnologie e.V., Jena; HL Planartechnik GmbH, Dortmund, both of Germany

[21] Appl. No.: 737,644

[22] PCT Filed: Mar. 21, 1996

[86] PCT No.: PCT/EP96/01248
§ 371 Date: Oct. 30, 1996
§ 102(e) Date: Oct. 30, 1996

[87] PCT Pub. No.: WO96/29568
PCT Pub. Date: Sep. 26, 1996

[30] Foreign Application Priority Data

Mar. 23, 1995 [DE] Germany ............... 195 10 579.6

[51] Int. Cl.[6] ............... G01B 7/30; G01P 3/487; G01R 33/09; G01D 5/12
[52] U.S. Cl. ............... 324/207.21; 324/174; 324/252
[58] Field of Search ............... 324/173, 174, 324/207.21, 207.25, 252; 338/32 R; 341/15

[56] References Cited

U.S. PATENT DOCUMENTS 5,602,471  2/1997  Muth et al. ............... 324/207.21

FOREIGN PATENT DOCUMENTS

43/17512A1  12/1994  Germany.

OTHER PUBLICATIONS

Peterson, A.: "Sensoren fuer beruehrungslosen Winkelmessung", meeting paper, Essen, Feb. 14th and 15th, 1995, with English abstract.

Primary Examiner—Gerard R. Strecker
Attorney, Agent, or Firm—Jordan and Hamburg

[57] ABSTRACT

A sensor for sensing at least one of angular position and rotation speed comprises a permanent magnet rotatable about an axis of rotation and at least three Wheatstone bridges each having four bridge resistors formed of magnetoresistive strip lines extending in planes parallel to a rotation plane of the permanent magnet. The bridge resistors of each of the at least three Wheatstone bridges are disposed on respective sides of quadrangles corresponding to respective ones of the at least three Wheatstone bridges. Each of the at least three Wheatstone bridges has two adjacently arranged ones of the bridge resistors connected to a half-bridge of respective ones of the at least three Wheatstone bridges. The quadrangles are disposed relative to one another rotated by a preselectable angle $\alpha$. The at least three Wheatstone bridges each have an intersection point of virtual diagonals connecting corners of respective ones of the quadrangles, the intersection points being arranged substantially concentrically about the axis of rotation, and the at least three Wheatstone bridges are disposed so as to be equally and evenly swept by a field of the permanent magnet during rotation thereof to saturate the bridge resistors.

19 Claims, 4 Drawing Sheets

MAGNETORESISTIVE ANGULAR POSITION SENSOR AND ROTATION SPEED SENSOR

BACKGROUND OF THE INVENTION

The invention relates to an angular position sensor and a rotation speed sensor, as applied over a wide range of techniques for non-contacting measurement of angles and speed of rotation, respectively.

There are three constructions which employ magnetoresistive strip lines arranged in a Wheatstone bridge pattern for measuring magnetic fields concerning magnitude and direction shown in German Patents DD 256 628 and DE 43 17 512. Conventionally, magneto-resistive strip lines are provided with so called Barber poles which permit the magnetoresistive strip lines to be arranged in parallel to one another which in turn reduces external electromagnetic interferences.

The manufacture of such Barber poles not only requires additional costs but also involves considerable technological requirements to obtain identical properties with respect to the poles relative to one another.

It has been proposed to realize the measuring objective (Peterson, A.:

"Sensoren zum Messen mechanischer Größen im Kfz", meeting paper, Essen, Feb., 14th and 15th, 1995) by using two mutually displaced Wheatstone bridges in which the sensing strip lines are made of magnetoresistive material.

The proposed solution requires that the strip lines, relative to the current flow direction in the strip line, be arranged in rotational symmetry relative to an axis of rotation corresponding to a rotation axis of a permanent magnet rotating above the strip lines. Such an arrangement is disadvantageous because additional electrical signals indicative of different angular positions can only be obtained electronically under the condition of specific assumptions.

SUMMARY OF THE INVENTION

It is an object of the invention to provide an angular position sensor and/or rotation speed sensor, comprising a permanent magnet rotating about an axis and a plurality of Wheatstone bridges, the measurement bridges of which are formed of four magnetoresistive strip lines each, embodied in thin-film technique, which are arranged in planes parallel to a rotation plane of the permanent magnet which is comparatively simple to manufacture and which produces signals for angle detection which can be electronically and uniquely obtained thus providing ease of evaluation.

Briefly stated, the present invention provides a sensor for sensing at least one of angular position and rotation speed, the sensor comprising a permanent magnet rotatable about an axis of rotation and at least three Wheatstone bridges each having four bridge resistors formed of magnetoresistive strip lines extending in planes parallel to a rotation plane of the permanent magnet. The bridge resistors of each of the at least three Wheatstone bridges are disposed on respective sides of quadrangles corresponding to respective ones of the at least three Wheatstone bridges. Each of the at least three Wheatstone bridges has two adjacently arranged ones of the bridge resistors connected to a half-bridge of respective ones of the at least three Wheatstone bridges. The quadrangles are disposed relative to one another rotated by a preselectable angle α. The at least three Wheatstone bridges each have an intersection point of virtual diagonals connecting corners of respective ones of the quadrangles, the intersection points being arranged substantially concentrically about the axis of rotation, and the at least three Wheatstone bridges are disposed so as to be equally and evenly swept by a field of the permanent magnet during rotation thereof to saturate the bridge resistors.

According to a feature of the invention, the intersection points are coaxially arranged to coincide with one another and with the axis of rotation of the permanent magnet.

By virtue of the embodiment of the magneto-resistive strip lines as a Wheatstone bridge and the defined arrangement of at least three of such bridges, it is feasible to obtain separate electrical signals from the Wheatstone bridges rotationally displaced relative to one another by a definite angle. This permits the building-up of simple assemblies which have only low requirements for adjustment and a field strength of the magnet employed.

BRIEF DESCRIPTION OF THE DRAWINGS

FIG. 4b shows a plan view of the embodiment of FIG. 4a; and

DETAILED DESCRIPTION OF THE INVENTION

Figure 1:
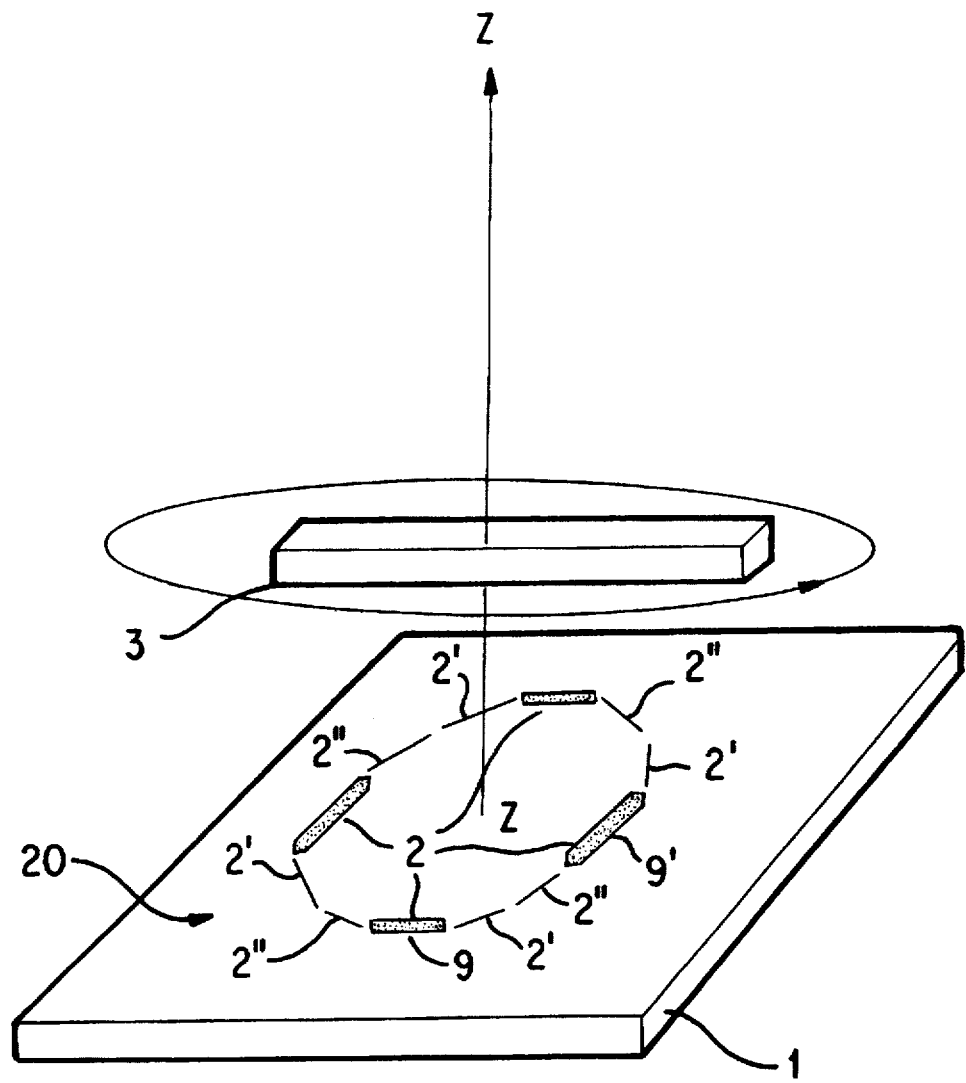
FIG. 1 shows a schematic representation of a basic embodiment according to the present invention including three Wheatstone bridges rotationally displaced relative to one another.

Referring to FIG. 1, three Wheatstone bridges 20 are provided on a substrate 1 which is formed of, for example, thermally oxidized silicon. Magnetoresistive strip lines 2, shown in bold, form a respective one of the Wheatstone bridges 20 and are preferably formed of permalloy.

Figure 3:
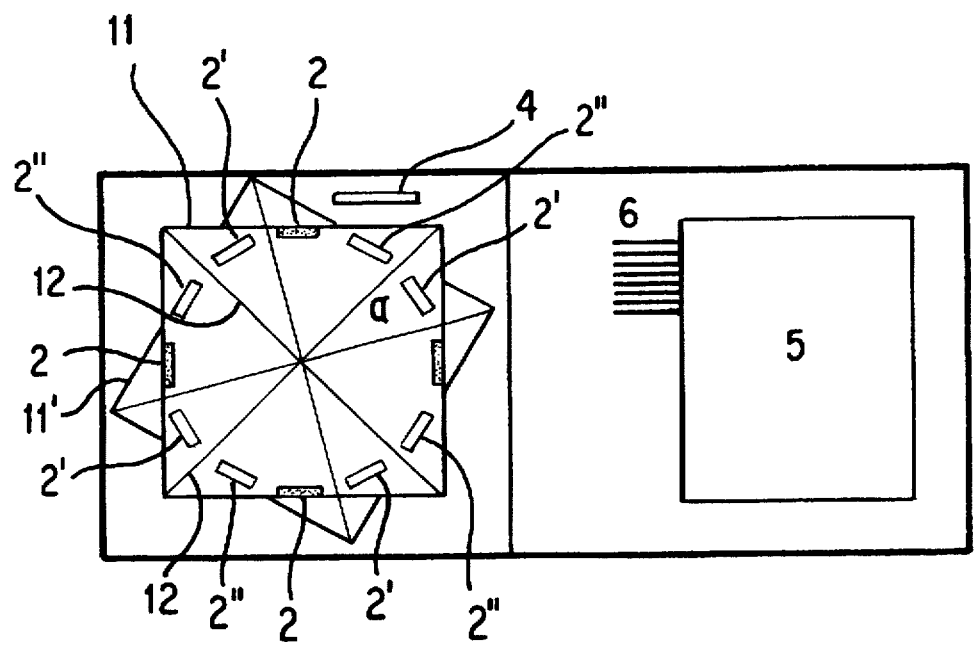
FIG. 3 shows the embodiment of FIG. 1 with schematically indicated external control and temperature compensation means.

Referring to FIGS. 1 and 3, the strip lines 2 are disposed in alignment with sides of a respective polygon 11 having the shape of a square. Typically, it is sufficient that each of the strip lines 2, 2', 2" of the respective ones of the Wheatstone bridges 20 only extend over a portion of the sides of a corresponding square. Points of intersection of virtual diagonals 12 of the square 11 and the other squares of other ones of the Wheatstone bridges 20, of which only square 11' is illustrated, are coaxially arranged relative to one another in the illustrated embodiment. It is understood that the polygons 11 and 11' and the virtual diagonals 12 are not physical features of the device but only serve as auxiliary lines for illustrating the design and, as such, are represented as hair lines in Fig. 3. The common intersections coincide with an axis Z—Z which represents the axis of rotation of a permanent magnet 3. When reduced to practice, the permanent magnet 3 of the illustrated embodiment is a bar magnet having, for example, a length of about 6 mm and a width of about 3 mm and is centrally arranged relative to and for rotation above the Wheatstone bridges 20 at a space of about 1 mm. It is essential that respective two adjacently arranged strip lines 9 and 9' are electrically connected as a half-bridge of the Wheatstone bridge 20; advantageously, the legs of the bridge formed by strip lines 9 and 9' include an angle of 90°.

It lies within the scope of the invention to embody the geometry and/or the electric dimensions of the three Wheatstone bridges identically or differently from one another. Thus, it is feasible to form the Wheatstone bridges of the present example in such a manner that, considered from inside to outside, that is, radially outwardly from the axis Z—Z, each successive bridge encompasses an area containing the preceding one. Typically, as in the present example, the bridges are arranged rotated relative to one another by an angle a equal to 30°. With the measuring principle according to the invention it is essential for all feasible embodiments, described hereinafter, that the respective layout of the Wheatstone bridges 20 and the dimensions of the permanent magnet 3 are so selected that all the Wheatstone bridges 20 are evenly covered by the field of the permanent magnet 3 while rotating so that the magnetoresistive strip lines 2, 2' and 2" are magnetically saturated.

Figure 2:
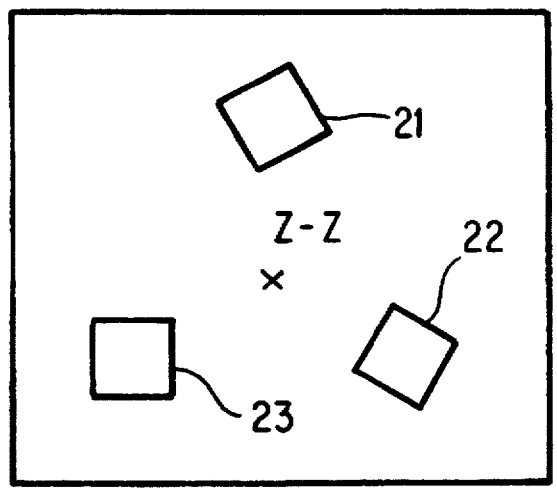
FIG. 2 shows a plan view of a variation of the embodiment of FIG. 1, wherein the Wheatstone bridges are circumferentially symmetrically arranged about an axis Z—Z.

Referring to FIG. 2, an embodiment of the present invention is shown having three Wheatstone bridges 21, 22, 23 with respective centers defined by intersection points of virtual diagonals that are circumferentially symmetrically and concentrically arranged about the axis Z—Z in contrast to FIG. 1 wherein the intersection points are coaxially arranged. The individual Wheatstone bridges 21, 22, 23 are rotated relative to one another about the axis Z—Z by an angle of 120°. The space distribution is a particularly advantageous embodiment within the scope of the invention to provide an angular position sensor and rotation speed sensor, having an operation range of 360°. However, this dimensioning is not to be considered as limiting.

An example of an alternative space distribution, applicable to either of the above embodiments, is one used where angular sensing devices have to be provided which only are adapted to capture narrow angular ranges. When n number of Wheatstone bridges are provided, where n≧3, different angles of rotation of the Wheatstone bridges relative to one another can be defined in accordance with (90–β)°/n, where 0°<β≦60°.

Referring again to FIG. 3, the embodiment according to FIG. 1 is shown with, schematically indicated, an external control and means for temperature compensation. For the sake of simplicity, a detailed representation of purely electric circuit means is omitted. The strip lines 2, 2' and 2" of respective ones of the Wheatstone bridges 20 are exemplified by different shadings. By means of an electronic circuit 5, also integrated in the substrate 1, which can be, for example, a custom-designed circuit, it is feasible to realize a cyclic commutation of the respective Wheatstone bridge tappings, apart from an evaluation of the signals from the individual Wheatstone bridges which result from the rotation of the permanent magnet 3. Furthermore, optionally provided on the substrate 1 is an additional magnetoresistive strip line 4 which is used for temperature compensation. Moreover, the respective circuit interconnections of all the components are achieved via the schematically indicated lines 6.

Figure 4A:
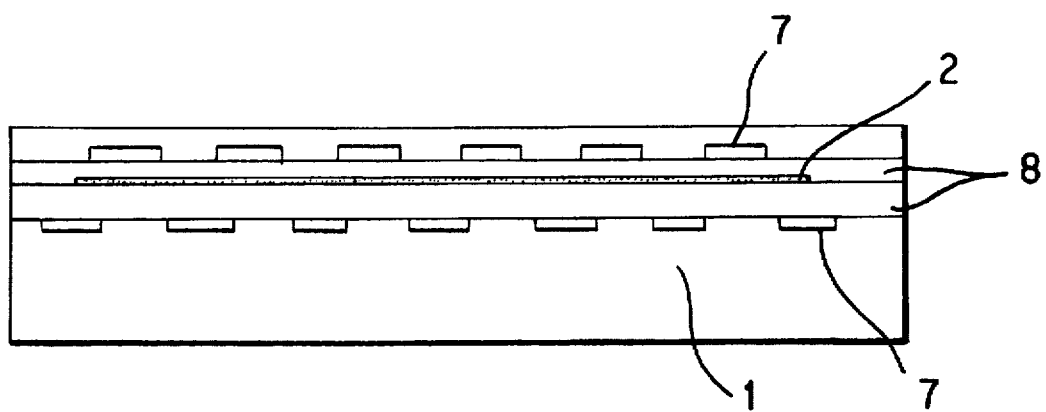
FIG. 4a shows a lateral cross-sectional view of an embodiment of the present invention having an integrated coil.
Figure 4B:
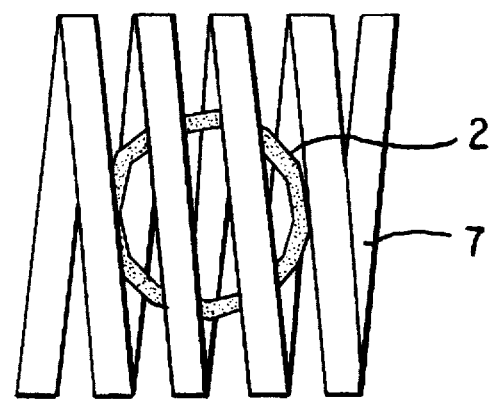

The arrangements described hereinbefore permit a one-to-one correlation of the measuring signal over an angular range of from 0° to 180°. Due to the effect of an additional field, the one-to-one correlated angular range can be extended from 0° to 360°. In accordance with the representation in FIGS. 4a (lateral cross-sectional view) and 4b (plan view of FIG. 4a) at least one field coil 7, isolated by respective insulating layers 8, is integrated in such a manner that the Wheatstone bridges 20 are encompassed therein. The field coil 7 is either pulsed by a alternating current or by current pulses at definite points in time to produce an additional magnetic field. In accordance with the invention the dimensioning and the current pulsing, respectively, of the field coil 7 is adapted to produce the additional magnetic field, affecting the magnetoresistive strip lines 2, 2' and 2" of the Wheatstone bridges 20, with an intensity of from one twentieth up to half the field strength of the permanent magnet 3. It also lies within the scope of the invention to embody the field coil as two helical coils arranged in different planes and provided with a suitable magnetic sense of winding, which is advantageous with respect to their microlithographic structuring.

Due to the additional magnetic field produced by the field coil 7, the direction of magnetization in the magnetoresistive strip lines 2, 2' and 2" , which substantially is determined by the relative position of the permanent magnet 3, can be additionally deviated by a certain measurable amount; the sign of the signal change produced by the additional field includes information on the direction of the permanent magnet 3.

Figure 5:
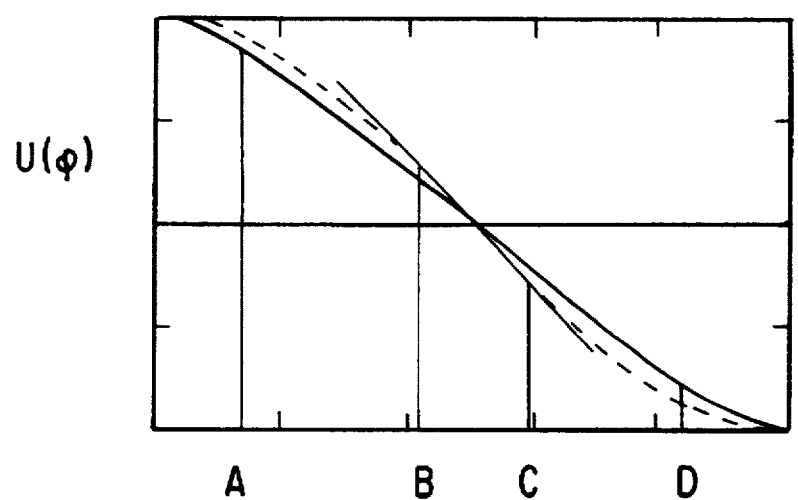
FIG. 5 shows a U(φ)-curve of magnetoresistive strips according to the invention.

Finally, FIG. 5 shows a U(φ)-curve of half a period of rotation produced by an embodiment of the magnetoresistive strip line 9. The magnetoresistive strip lines 2, 2' and 2" are embodied with the intention that the field of the permanent magnet on the Wheatstone bridge is threefold to sixfold the anisotropic field of the strip lines 2, 2' and 2"; typically the strip lines 2, 2' and 2" have a length-width ratio of 10:1 with a width of smaller than 4 μm and a thickness in an order of size of greater than or equal to 20 nm. A pure sinusoidal signal, indicated by dash-points and produced by, for example, an equal field of the permanent magnet and a strip line having a width of about 10 μm, only exhibits a linear curve shape between the points B and C, in contrast to the strip lines according to the present invention which exhibit a considerably greater linear range between the points A and D which is of particular advantage when the signals are processed and evaluated.

The angular position sensor and/or rotation speed sensor of the present invention are applicable for a high-speed detection up to high frequency ranges, for example, on an order of 10 MHz.

Furthermore, it lies within the scope of the invention, to provide at least one resistor balancing face to each Wheatstone bridge employed, which can be realized without any difficulties using known micro-structuring techniques.

Still further it lies within the scope of the invention to embody each individual magnetoresistive strip line 9 by a series-connection of a plurality of and, if required, differing length magnetoresistive strips parallel to one another. Due to this measure it is feasible to exploit the substrate space effectively. Apart from such an embodiment of the magnetoresistive strip lines any other measures of the invention are still relevant.

All features disclosed in the specification, in the subsequent claims, and represented in the drawings can be substantial for the invention individually, but also in combination with one another.

What is claimed is:

1. A sensor for sensing at least one of angular position and rotation speed, the sensor comprising:

a permanent magnet rotatable about an axis of rotation;

at least three Wheatstone bridges each having four bridge resistors formed of magnetoresistive strip lines extending in planes parallel to a rotation plane of said permanent magnet;

said bridge resistors of each of said at least three Wheatstone bridges being disposed on respective sides of quadrangles corresponding to respective ones of said at least three Wheatstone bridges each of said at least three Wheatstone bridges having two adjacently arranged ones of said bridge resistors connected to a half-bridge of respective ones of said at least three Wheatstone bridges;

said quadrangles being disposed relative to one another rotated by a preselectable angle $\alpha$;

said at least three Wheatstone bridges each having an intersection point of virtual diagonals connecting corners of respective ones of said quadrangles, said intersection points being arranged substantially concentrically about said axis of rotation; and said at least three Wheatstone bridges being disposed so as to be equally and evenly swept by a field of the permanent magnet during rotation thereof to saturate said bridge resistors.

2. The sensor according to claim 1, wherein said intersection points are coaxially arranged to coincide with one another and with the axis of rotation permanent magnet.

3. The sensor as claimed in claim 1, wherein said intersection points are disposed circumferentially symmetrical about said axis of rotation of said permanent magnet.

4. The sensor as claimed in any one of the claims 1 to 3, wherein each of said two adjacently arranged ones of said bridge resistors define an angle of 90°.

5. The sensor as claimed in any one of the preceding claims 1 to 3, wherein said four bridge resistors of a respective one of said Wheatstone bridges are disposed along sides of a square.

6. The sensor as claimed in any one of the preceding claims 1 to 3, wherein said Wheatstone bridges have substantially identical geometry and electrical characteristics.

7. The sensor as claimed in any one of the preceding claims 1 to 3, wherein said Wheatstone bridges have differing geometry and electrical characteristics relative to one another.

8. The sensor as claimed in any one of the preceding claims 1 to 3, wherein said Wheatstone bridges are arranged in a plurality of planes electrically insulated from one another.

9. The sensor as claimed in any one of the preceding claims 1 to 3, wherein, wherein said at least three Wheatstone bridges includes n Wheatstone bridges, where n is $\geq 3$, and said angle $\alpha$ is 90°/n.

10. The sensor as claimed in any of the preceding claims 1 to 3, wherein, wherein said at least three Wheatstone bridges includes n Wheatstone bridges, where n is $\geq 3$, and said angle $\alpha$ is $(90-\beta)°/n$, where $\beta$ lies between $0° \leq \beta \leq 60°$.

11. The sensor as claimed in any one of the preceding claims 1 to 3, wherein each of said magnetoresistive strip lines includes a plurality of individual magnetoresistive strip line portions in parallel to and electrically connected with one another.

12. The sensor as claimed in claim 1, wherein the field of the permanent magnet affecting the Wheatstone bridges is treble to sixfold times an anisotropic field of the magnetoresistive strip lines, where the magnetoresistive strip lines have a length-to-width ratio greater 10.

13. The sensor as claimed in claim 12, wherein the magnetoresistive strip lines have a width less than 4 µm and a thickness greater than or equal to about 20 µm.

14. The sensor as claimed in any one of the preceding claims 1 to 3, wherein at least one special balancing resistance face is correlated to each of said Wheatstone bridges.

15. The sensor as claimed in any one of the preceding claims 1 to 3, wherein said Wheatstone bridges are arranged on a carrier substrate and are encompassed by at least one field coil.

16. The sensor as claimed in claim 15, wherein said field coil is integrated in or on said carrier substrate.

17. The sensor as claimed in claim 15, wherein said field coil is pulseable by an alternating current.

18. The sensor as claimed in claim 15, wherein said field coil is pulseable by a current pulse at preselected definite points in time.

19. A sensor for sensing at least one of angular position and rotation speed, the sensor comprising:

a permanent magnet rotatable about an axis of rotation;

at least three Wheatstone bridges each having four bridge resistors formed of magnetoresistive strip lines extending in planes parallel to a rotation plane of said permanent magnet;

said bridge resistors of each of said at least three Wheatstone bridges being disposed on respective sides of quadrangles corresponding to respective ones of said at least three Wheatstone bridges;

each of said at least three Wheatstone bridges having two adjacently arranged ones of said bridge resistors connected to a half-bridge of respective ones of said at least three Wheatstone bridges;

said quadrangles being disposed relative to one another rotated by a preselectable angle $\alpha$;

said at least three Wheatstone bridges each having an intersection point of virtual diagonals connecting corners of respective ones of said quadrangles, said intersection points being arranged substantially coaxially with said axis of rotation; and said at least three Wheatstone bridges being disposed so as to be equally and evenly swept by a field of the permanent magnet during rotation thereof to saturate said bridge resistors.

* * * * *